(12) United States Patent
Eiraku (10) Patent No.: US 7,991,536 B2
(45) Date of Patent: Aug. 2, 2011

(54) CONTROL SYSTEM AND CONTROL METHOD FOR INTERNAL COMBUSTION ENGINE EQUIPPED WITH SUPERCHARGER

(75) Inventor: Akira Eiraku, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 636 days.

(21) Appl. No.: 11/793,769

(22) PCT Filed: Aug. 14, 2006

(86) PCT No.: PCT/IB2006/002207
§ 371 (c)(1),
(2), (4) Date: Jun. 22, 2007

(87) PCT Pub. No.: WO2007/023344
PCT Pub. Date: Mar. 1, 2007

(65) Prior Publication Data
US 2008/0109145 A1 May 8, 2008

(30) Foreign Application Priority Data
Aug. 22, 2005 (JP) .................. 2005-240076

(51) Int. Cl.
*B60T 7/12* (2006.01)
(52) U.S. Cl. ................................. 701/103

(58) Field of Classification Search ............. 60/599, 60/605.2; 73/114.31, 117.74, 117.3, 118.1; 701/102, 29, 1, 104, 108, 84, 114, 110; 123/568.14, 123/568.12, 568.21, 563; 180/197; 303/112, 303/113.2
See application file for complete search history.

(56) References Cited

U.S. PATENT DOCUMENTS

| 6,279,551 | B1 | 8/2001 | Iwano et al. |
| 6,318,083 | B1 | 11/2001 | Machida et al. |
| 6,868,329 | B2 * | 3/2005 | Ito et al. ............. 701/108 |
| 2004/0084031 | A1 * | 5/2004 | Ito et al. ............. 123/568.21 |

FOREIGN PATENT DOCUMENTS

| EP | 1 398 490 A2 | 3/2004 |
| JP | A 11-141375 | 5/1999 |
| JP | A 11-351010 | 12/1999 |
| JP | A 2000-97080 | 4/2000 |
| JP | A 2001-90573 | 4/2001 |
| JP | A 2004-60479 | 2/2004 |

* cited by examiner

*Primary Examiner* — Michael Cuff
*Assistant Examiner* — Keith Coleman
(74) *Attorney, Agent, or Firm* — Oliff & Berridge, PLC

(57) ABSTRACT

A control system for an internal combustion engine equipped with a supercharger calculates a target intake mass airflow ($m_t'$) in accordance with an accelerator pedal travel ($\theta_A$), using a virtual internal combustion engine model having a virtual upstream intake air pressure ($P_A$). The control system then calculates a target throttle opening ($\theta$) in accordance with a measured upstream intake pressure ($P_{IN}$) so as to provide the target intake mass airflow ($m_t'$), and controls a throttle valve based on the target throttle opening ($\theta$).

13 Claims, 8 Drawing Sheets

FIG.9A THROTTLE OPENING

FIG.9B THROTTELE FLOW RATE

FIG.9C UPSTREAM INTAKE AIR PRESSURE / DOWNSTREAM INTAKE AIR PRESSURE

FIG9D TORQUE

FIG.11A THROTTLE OPENING

FIG.11B VEHICLE ACCELERATION

FIG.11C ENGINE SPEED

FIG.11D THROTTELE FLOW RATE

FIG.11E UPSTREAM INTAKE AIR PRESSURE / ATMOSPHERIC PRESSURE / DOWNSTREAM INTAKE AIR PRESSURE

FIG.11F TORQUE

TIME

CONTROL SYSTEM AND CONTROL METHOD FOR INTERNAL COMBUSTION ENGINE EQUIPPED WITH SUPERCHARGER

TECHNICAL FIELD

The invention generally relates to control technologies for internal combustion engines equipped with superchargers, and particularly relates to throttle control technologies for improving the acceleration characteristics (or torque characteristics) of the internal combustion engines equipped with superchargers.

BACKGROUND ART

Various technologies for throttle control in an internal combustion engine equipped with a supercharger have been proposed in, for example, JP-A-2004-60479, JP-A-2001-90573, JP-A-11-351010, JP-A-11-141375 and JP-A-2000-97080. As a common feature of the conventional technologies as disclosed in these publications, a target torque or a target boost pressure is determined, and the throttle valve is controlled so as to achieve the target torque or target boost pressure. For example, in the prior art as disclosed in JP-A-2004-60479, a turbo-lag index is calculated based on the information on the boost pressure, and the throttle opening is controlled based on the turbo-lag index so as to provide desired torque characteristics. In the prior art as disclosed in JP-A-2001-90573, the throttle opening is corrected in accordance with a difference between the target boost pressure and the actual boost pressure (or estimated boost pressure).

FIG. 11 shows changes in the vehicle acceleration (B), engine speed (C), throttle flow rate (D), upstream intake air pressure and downstream intake air pressure (E) and torque (F) with respect to changes in the throttle opening (A), for comparison between an internal combustion engine equipped with a supercharger and a naturally aspirated engine having the same maximum torque. In FIG. 11, solid lines indicate the above-mentioned changes in the engine equipped with the supercharger, and broken lines indicate the above-mentioned changes in the naturally aspirated engine. As shown in FIG. 11, the vehicle having the engine equipped with the supercharger has two acceleration stages (i.e., is accelerated in two steps) due to a so-called turbo lag (or a delay in supercharging), and it takes a comparatively long time to reach the maximum acceleration. These acceleration characteristics may make the driver feel frustrated or uncomfortable.

To prevent the driver from feeling frustrated or uncomfortable during acceleration, it is desirable for the engine equipped with the supercharger to provide smooth acceleration characteristics as provided by the naturally aspirated engine. Since the acceleration characteristics of the vehicle depend upon a target value, such as a target torque or a target boost pressure, the method of setting the target value may be regarded as an extremely important technical matter to be considered for achieving ideal acceleration characteristics. However, no specific disclosure about the method of setting the target torque or target boost pressure is provided in any of the above-indicated patent publications.

DISCLOSURE OF INVENTION

It is therefore an object of the invention to provide a control system and a method for an internal combustion engine equipped with a supercharger, which achieves ideal acceleration characteristics without being affected by a delay (e.g., turbo lag) in supercharging of the supercharger.

To accomplish the above and/or other object(s), there is provided according to one aspect of the invention a control system for an internal combustion engine equipped with a supercharger, comprising: (a) accelerator pedal travel measuring means for measuring a travel of an accelerator pedal, (b) intake air pressure measuring means for measuring a pressure of intake air at a location upstream of a throttle valve and downstream of the supercharger, (c) target intake mass airflow calculating means including a virtual internal combustion engine model having a virtual upstream intake air pressure, for calculating a target intake mass airflow in accordance with the measured accelerator pedal travel, using a relationship between the accelerator pedal travel and the intake mass airflow in the virtual engine model, (d) target throttle opening calculating means for calculating a target throttle opening in accordance with the measured upstream intake air pressure, so as to provide the calculated target intake mass airflow, and (e) throttle control means for controlling the throttle valve based on the target throttle opening.

According to the above aspect of the invention, the control system calculates the target throttle opening, using the intake mass airflow obtained from the virtual internal combustion engine model as the target intake mass airflow, and controls the throttle valve based on the target throttle opening, so that the engine equipped with the supercharger achieves substantially the same torque characteristics as the virtual engine model. Furthermore, since the torque characteristics of the virtual engine model change depending upon the set value of the virtual upstream intake air pressure, the engine can provide desired acceleration characteristics by setting the virtual upstream intake air pressure to an appropriate value.

In one embodiment of the invention, the virtual upstream intake air pressure is set to a constant value in the virtual engine model. Since the virtual upstream intake air pressure is set to a constant value, as is the case with the upstream intake air pressure of a naturally aspirated internal combustion engine, the engine equipped with the supercharger can provide step-free, smooth acceleration characteristics as provided by the naturally aspirated engine.

In another embodiment of the invention, the target intake mass airflow calculating means sets the virtual upstream intake air pressure in accordance with the upstream intake air pressure measured by the intake air pressure measuring means. Since the virtual upstream intake air pressure is set in accordance with the measured upstream intake air pressure, the torque characteristics of the virtual engine model can be set in view of the measured upstream intake air pressure.

In a further embodiment of the invention, the target intake mass airflow calculating means sets the virtual upstream intake air pressure of the virtual engine model to a predetermined value when the measured upstream intake air pressure is equal to or lower than the predetermined value, and sets the virtual upstream intake air pressure to be equal to the measured upstream intake air pressure when the measured upstream intake air pressure exceeds the predetermined value.

According to the above embodiment of the invention, when the measured upstream intake air pressure is equal to or lower than the predetermined value, the virtual upstream intake air pressure is set to the predetermined value, namely, is set to a fixed or constant value as is the case with the upstream intake air pressure of a naturally aspirated engine, so that the engine can provide step-free, smooth acceleration characteristics as provided by the naturally aspirated engine. When the measured upstream intake air pressure further increases and exceeds the predetermined value, the measured upstream intake air pressure is used as the set value of the virtual upstream intake air pressure. As a result, the target intake mass airflow calculated using the virtual engine model increases in accordance with an increase in the measured upstream intake air pressure, thus enabling the vehicle to be accelerated in accordance with the increase in the measured upstream intake air pressure.

In one feature of the above embodiment of the invention, the predetermined value is lower than an upper-limit value of an intake air pressure at a downstream location of the throttle valve, and the target intake mass airflow calculating means sets the virtual upstream intake air pressure to the upper-limit value of the downstream intake air pressure when the measured upstream intake air pressure exceeds the upper-limit value of the downstream intake air pressure. Since the virtual upstream intake air pressure is restricted by the upper-limit value of the downstream intake air pressure when the measured upstream intake air pressure exceeds the upper-limit value of the downstream intake air pressure, the target intake mass airflow calculated using the virtual engine model is also restricted, whereby the downstream intake air pressure is prevented from being excessively large, i.e., being larger than the upper-limit value.

In a still another embodiment of the invention, the control system further includes intake air temperature measuring means for measuring a temperature of intake air after supercharging by the supercharger, and the target throttle opening calculating means corrects the target throttle opening based on the intake air temperature measured by the intake air temperature measuring means.

According to the above embodiment of the invention, the target throttle opening reflects an increase of the intake air temperature resulting from compression of air by the supercharger. Thus, the engine equipped with the supercharger is able to provide ideal acceleration characteristics similar to those of a naturally aspirated engine.

BRIEF DESCRIPTION OF DRAWINGS

FIGS. 5A-G are views showing the result of throttle control in the case where the target throttle opening is calculated by a method according to the first embodiment of the invention;

FIGS. 8A-G are views showing the result of throttle control in the ease where the target throttle opening is calculated by a method according to the second embodiment of the invention;

FIGS. 9A-D are views showing the result of throttle control in the case where the target throttle opening is calculated by the method according to the second embodiment of the invention;

FIGS. 10A-E are views showing the result of throttle control in the case where the target throttle opening is calculated by a method according to a modified embodiment of the invention; and FIGS. 11A-F are views showing, for comparison purposes, acceleration characteristics of a conventional internal combustion engine equipped with a supercharger and those of a naturally aspirated internal combustion engine.

MODES FOR CARRYING OUT THE INVENTION

First Embodiment

Figure 1:
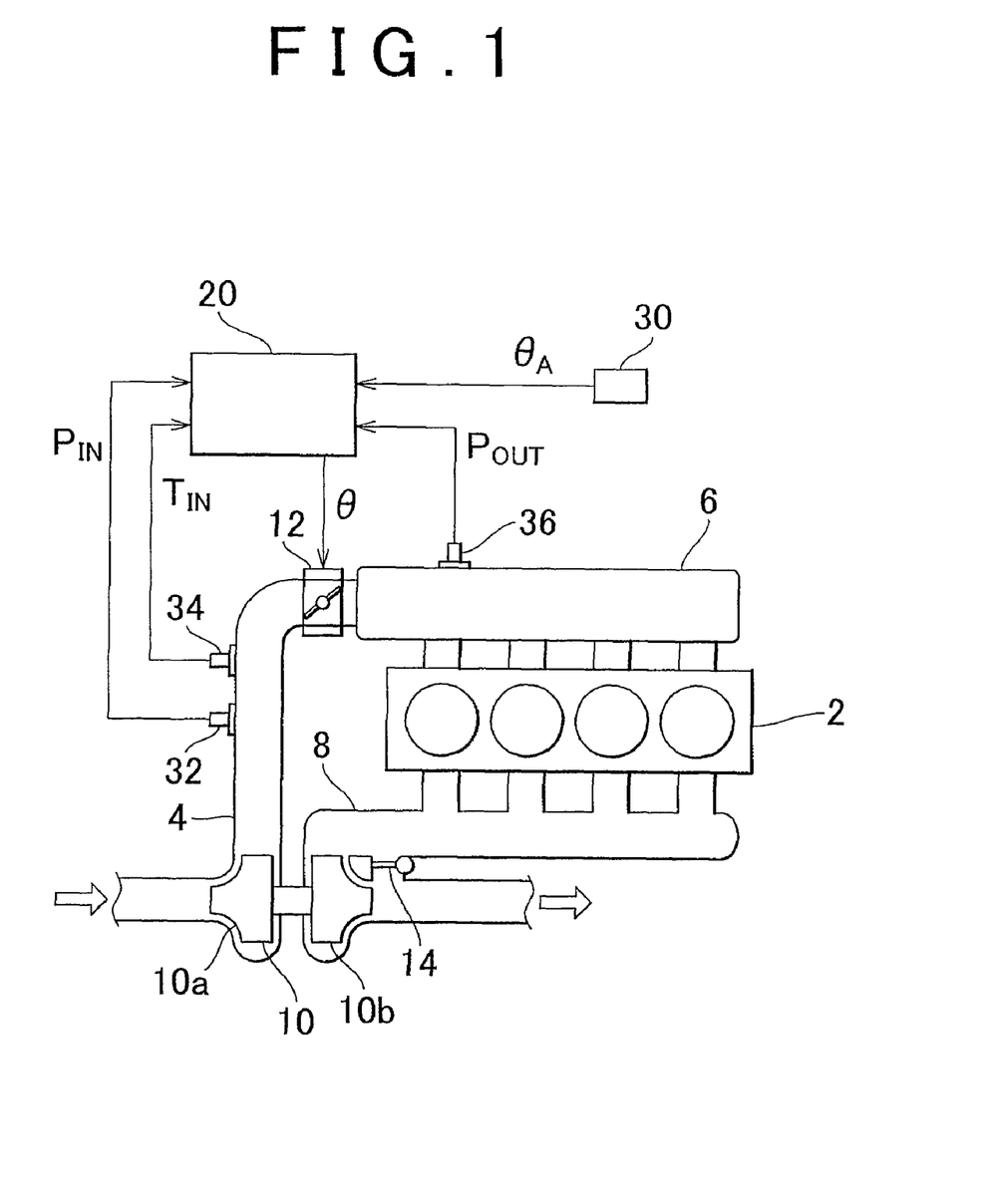
FIG. 1 is a schematic view of an internal combustion engine equipped with a supercharger, to which a control system according to a first embodiment of the invention is applied.

Referring to FIG. 1 through FIG. 5, a first exemplary embodiment of the invention will be described in detail. FIG. 1 schematically shows an internal combustion engine equipped with a supercharger, which employs a control system according to the first embodiment of the invention. In this embodiment, the invention is applied to a so-called turbo engine, namely, an internal combustion engine equipped with a turbocharger as one type of supercharger. As shown in FIG. 1, the turbo engine has an engine body 2, to which an intake passage 4 and an exhaust passage 8 are connected. A surge tank 6 is formed in the intake passage 4, and an electronically controlled throttle valve 12 is disposed upstream of the surge tank 6. A turbocharger 10 includes a compressor 10a disposed in the intake passage 4, and a turbine 10b disposed in the exhaust passage 8. In operation, the compressor 10a and turbine 10b rotate as a unit. A wastegate valve 14 is also provided in the exhaust passage 8 for allowing exhaust gas to pass therethrough while bypassing the turbine 10b.

The turbine engine of FIG. 1 includes an ECU (Electronic Control Unit) 20 for controlling the operating conditions of the engine body 2. Various devices or equipment including, for example, the throttle valve 12 are connected to the output side of the ECU 20, and various sensors are connected to the input side of the ECU 20. In the turbo engine, a downstream intake air pressure sensor 36 that generates a signal indicative of the pressure $P_{OUT}$ downstream of the throttle valve 12 is mounted in the surge tank 6. A upstream intake air pressure sensor 32 that generates a signal indicative of the pressure $P_{IN}$ upstream of the throttle valve 12 and an intake air temperature sensor 34 that generates a signal indicative of the temperature $T_{IN}$ of the intake air are mounted downstream of the compressors 10a and upstream of the throttle valve 12 in the intake passage 4. In addition, an accelerator pedal position sensor 30 that generates a signal indicative of the travel or operation amount $\theta_A$ of the accelerator pedal is provided. While the ECU 20 is connected to a plurality of devices and sensor's other than the above-indicated devices and sensors, no further explanation will be provided herein. The ECU 20 is adapted to drive the respective devices according to certain control programs, based on the outputs of the respective sensors.

Figure 2:
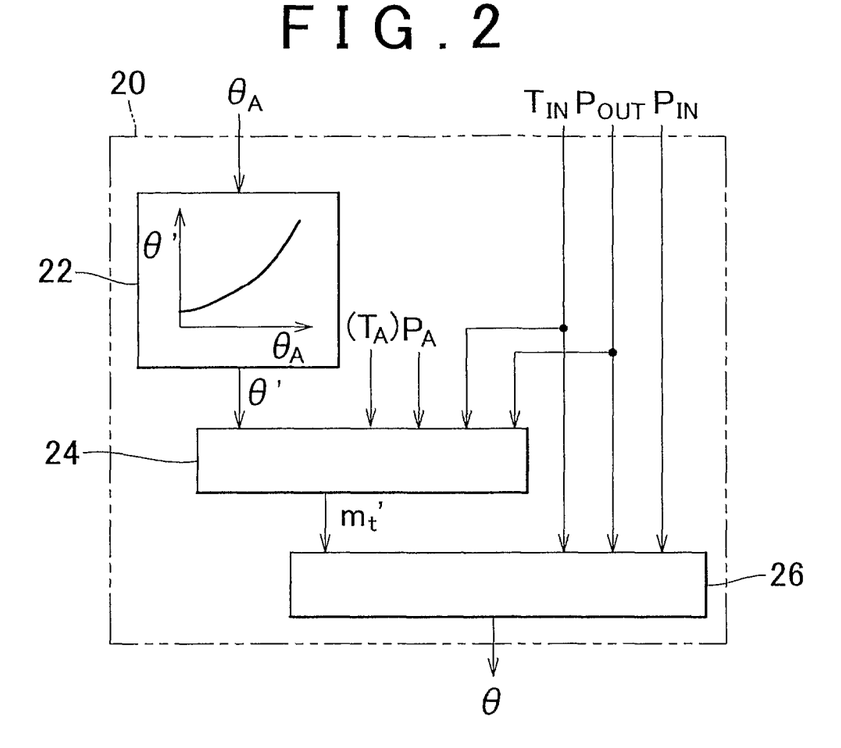
FIG. 2 is a block diagram useful for explaining the operation of ECU during throttle control in the first embodiment of the invention.

The ECU 20 serving as a control unit of the turbo engine performs throttle control, as one of its functions, for controlling the opening θ of the throttle valve 12 in accordance with the acceleration pedal travel $\theta_A$. The operation of the ECU 20 when performing the throttle control will be explained with reference to the block diagram of FIG. 2. As shown in FIG. 2, during the throttle control, the ECU 20 operates as a first computing unit 22 that calculates a provisional target throttle opening, a second computing unit 24 that calculates a target throttle flow rate (target intake mass airflow), and a third computing unit 26 that calculates a target throttle opening.

Initially, the ECU 20 operates as the first computing unit 22. More specifically, the ECU 20 calculates the provisional target throttle opening θ' using a pre-set virtual engine model (a virtual model of internal combustion engine). The virtual engine model is an engine model that simulates the torque characteristics of a naturally aspirated engine. In the virtual engine model, the upstream intake air pressure is assumed to be a constant pressure (virtual upstream intake air pressure) $P_A$ that is higher than the atmospheric pressure, so as to provide equivalent torque with the same displacement as the turbo engine. The ECU 20 obtains the throttle opening θ' in accordance with the accelerator pedal travel $θ_A$ measured by the accelerator pedal position sensor 30, using the relationship between the accelerator pedal travel $θ_A$ and the throttle opening θ' in the virtual engine model, and sets the obtained throttle opening θ' as the provisional target throttle opening θ'.

Next, the ECU 20 operates as the second computing unit 24. More specifically, the ECU 20 calculates a target throttle flow rate (i.e., target intake mass airflow) using the above-described virtual engine model. In the virtual engine model, the opening of the throttle valve 12 is set to θ' when the accelerator pedal travel is equal to $θ_A$, as described above. With the throttle opening thus set, the throttle flow rate $m_t'$ of the virtual engine model can be calculated by substituting the throttle opening θ', virtual upstream intake air pressure $P_A$, downstream intake air pressure $P_{OUT}$ and the intake air temperature $T_{IN}$ into equation (1) known as a nozzle formula as indicated below. In the equation (1), the downstream intake air pressure $P_{OUT}$ is a pressure actually measured by the downstream intake air pressure sensor 36, and the intake air temperature $T_{IN}$ is a temperature actually measured by the intake air temperature sensor 34.

$$m_t'(\theta') = \frac{P_A}{\sqrt{T_{IN}}} B(\theta') \phi\left(\frac{P_{OUT}}{P_A}\right) \tag{1}$$

Figure 3:
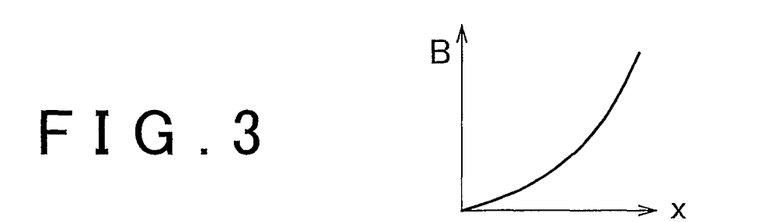
FIG. 3 is a graph indicating the relationship between function B and variable x.
Figure 4:
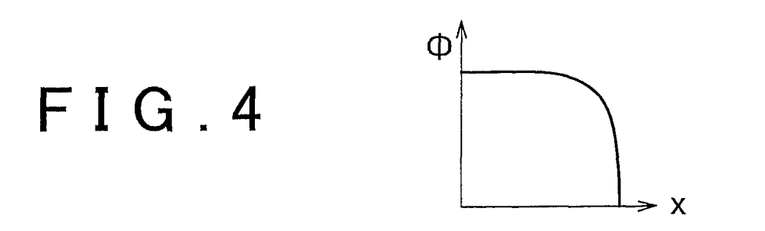
FIG. 4 is a graph indicating the relationship between function ~ and variable x.

In the above equation (1), B is a function of the throttle opening including the flow coefficient, and has a certain relationship with variable x as shown in FIG. 3, and φ is a function as expressed by equation (2) as indicated below, and has a certain relationship with variable x as shown in FIG. 4. In the following equation (2), k is the ratio of specific heat.

$$\phi(x) = x^{\frac{1}{k}} \sqrt{\frac{2k}{k-1}\left(1 - x^{\frac{k-1}{k}}\right)}, \; x > \left(\frac{2}{k+1}\right)^{\frac{k}{k-1}} \tag{2}$$

$$\phi(x) = \left(\frac{2}{k+1}\right)^{\frac{1}{k-1}} \sqrt{\frac{2k}{k-1}}, \; x \leq \left(\frac{2}{k+1}\right)^{\frac{k}{k-1}}$$

The output torque of the engine is determined by the throttle flow rate. In order for the turbo engine to achieve substantially the same torque characteristics as the naturally aspirated engine, therefore, the throttle valve 12 may be controlled so that air flows through the throttle valve 12 at the same rate as the throttle flow rate $m_t'$ of the virtual engine model. Namely, the throttle valve 12 may be controlled using the throttle flow rate $m_t'$ of the virtual engine model as a target throttle flow rate. Thus, the ECU 20 sets the throttle flow rate $m_t'$ expressed by the above equation (1) as the target throttle flow rate.

Next, the ECU 20 operates as the third computing unit 26. The throttle flow rate $m_t$ obtained when the throttle opening is set to θ in the turbo engine can be expressed by equation (3) as indicated below, using the throttle opening θ and the upstream intake air pressure $P_{IN}$, downstream intake air pressure $P_{OUT}$ and the intake air temperature $T_{IN}$ measured by the respective sensors 32, 36, 34.

$$m_t(\theta) = \frac{P_{IN}}{\sqrt{T_{IN}}} B(\theta) \phi\left(\frac{P_{OUT}}{P_{IN}}\right) \tag{3}$$

The ECU 20 sets the throttle opening θ so that the throttle flow rate $m_t$ determined by the above equation (3) becomes equal to the target throttle flow rate $m_t'$, namely, so as to satisfy the following equation (4).

$$m_t(\theta) = m_t'(\theta') \tag{4}$$

The throttle opening θ that satisfies the above equation (4) may be calculated according to equation (5) as indicated below. In the expression (5), $B^{-1}$ is an inverse function of B. The ECU 20 sets the throttle opening θ obtained according to the equation (5) as the target throttle opening.

$$\theta = B^{-1}\left(\frac{P_A}{P_{IN}} B(\theta') \frac{\phi\left(\frac{P_{OUT}}{P_A}\right)}{\phi\left(\frac{P_{OUT}}{P_{IN}}\right)}\right) \tag{5}$$

Figure 5A:
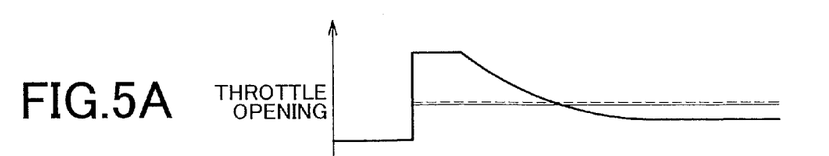
Figure 5B:
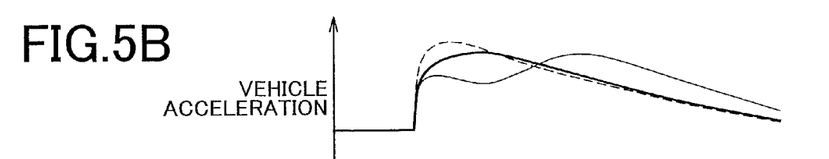
Figure 5C:
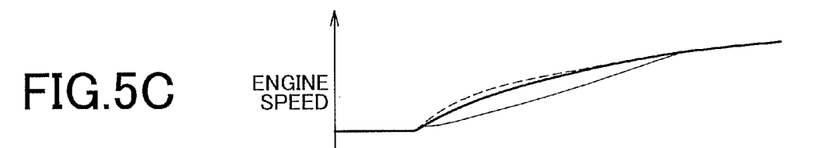
Figure 5D:
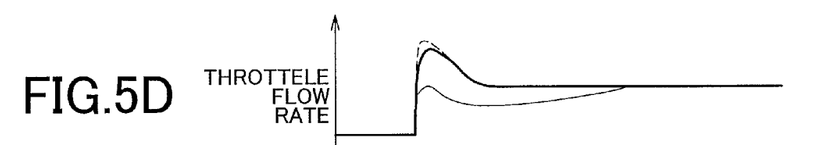
Figure 5E:
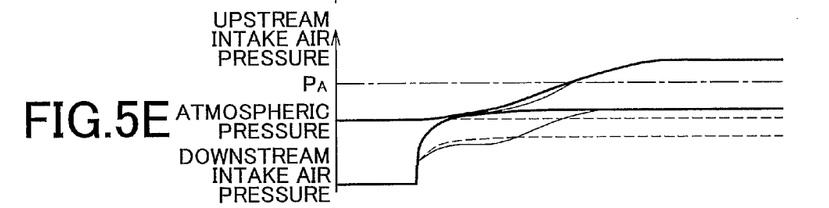
Figure 5F:
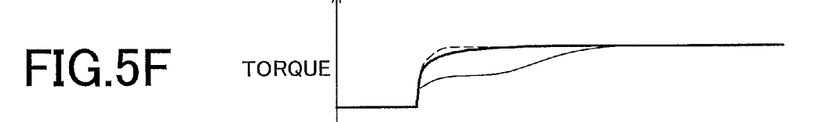
Figure 5G:
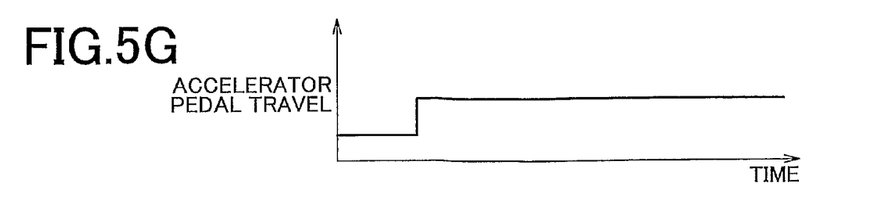

The ECU 20 controls the throttle valve 12 in accordance with the target throttle opening θ calculated in the manner as described above. The result of the throttle control by the ECU 20 is shown in FIG. 5. In FIG. 5, changes in the throttle opening (A), vehicle acceleration (B), engine speed (C), throttle flow rate (D), upstream intake air pressure and downstream intake air pressure (E) and torque (F) are plotted against changes in the accelerator pedal travel (G) during acceleration of the vehicle, with respect to the turbo engine of this embodiment, a conventional turbo engine, and a naturally aspirated engine. The naturally aspirated engine is supposed to provide the same torque as the turbo engine of this embodiment. In FIG. 5, thick solid lines indicate changes in the turbo engine of this embodiment, and thin solid lines indicate changes in the conventional turbo engine, while broken lines indicate changes in the naturally aspirated engine.

As shown in FIG. 5, when the driver depresses the accelerator pedal, the throttle valve of the turbo engine of this embodiment is opened by a larger degree than those of the conventional turbo engine and the naturally aspirated engine. If the upstream intake air pressure $P_{IN}$ of the turbo engine reaches the virtual upstream intake air pressure $P_A$ of the virtual engine model at the time of depression of the accelerator pedal, the turbo engine can provide substantially the same throttle flow rate as the naturally aspirated engine by setting the throttle opening to be equal to that of the naturally aspirated engine. However, the upstream intake air pressure $P_{IN}$ at the time of start of acceleration is lower than the virtual upstream intake air pressure $P_A$ because of a turbo lag of the turbo engine. In the turbo engine of this embodiment, therefore, the throttle opening is set to be larger than that of the naturally aspirated engine (the throttle valve is fully opened in the example of FIG. 5) so as to make up for the low level of the upstream intake air pressure.

By setting the throttle opening to a large degree as described above, the turbo engine of this embodiment ensures a throttle flow rate close to that of the naturally aspirated engine from the time immediately after the accelerator pedal is depressed. As a result, the turbo engine is able to develop desired torque at an early stage, and the vehicle acceleration rises from the beginning without dropping once before reaching its maximum as in the conventional turbo engine. Furthermore, the time it takes the turbo engine to reach the maximum acceleration can be made close to that of the naturally aspirated engine. Thus, the turbo engine of this embodiment achieves step-free, smooth acceleration characteristics similar to those of the naturally aspirated engine.

While the virtual upstream intake air pressure $P_A$ of the virtual engine model is constant, as is the case with the naturally aspirated engine, the upstream intake air pressure $P_{IN}$ of the turbo engine increases due to supercharging of the turbocharger 10. If the throttle opening is kept constant, the throttle flow rate increases as the upstream intake air pressure $P_{IN}$ increases. In the turbo engine of this embodiment, however, the throttle opening is set to be smaller as the upstream intake air pressure $P_{IN}$ increases. If the upstream intake air pressure $P_{IN}$ exceeds the virtual upstream intake air pressure $P_A$, the throttle opening of the turbo engine is set to be smaller than that of the naturally aspirated engine. In this manner, the turbo engine can maintain substantially the same throttle flow rate as the naturally aspirated engine even after the upstream intake air pressure $P_{IN}$ increases due to supercharging of the turbocharger 10.

In the turbo engine of FIG. 1, when the boost pressure of the turbocharger 10 becomes excessively large for some reason, the wastegate valve 14 is operated to positively reduce the upstream intake air pressure $P_{IN}$. Even with this control, the turbo engine of this embodiment is able to provide substantially the same throttle flow rate as the naturally aspirated engine, irrespective of changes in the upstream intake air pressure $P_{IN}$, thus preventing the vehicle acceleration from changing without regard to the driver's intention.

Second Embodiment

Figure 6:
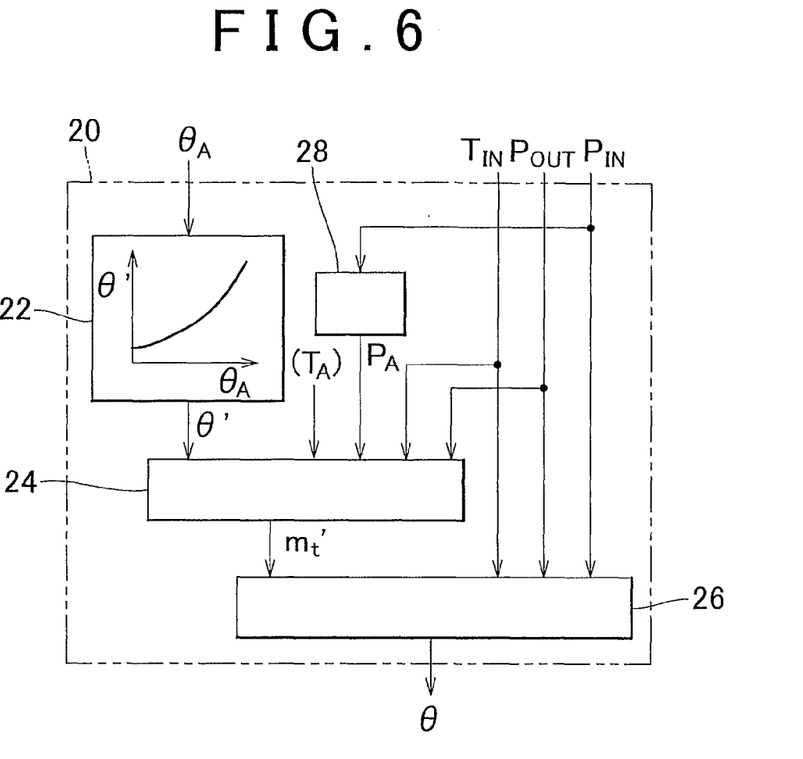
FIG. 6 is a block diagram useful for explaining the operation of ECU during throttle control in a second embodiment of the invention.

Referring next to FIG. 6 through FIG. 9, a second exemplary embodiment of the invention will be described in detail. The block diagram of FIG. 6 shows the operation of the ECU 20 when it performs throttle control. In this embodiment, the ECU 20 operates, during the throttle control, as a first computing unit 22 that calculates a provisional target throttle opening, a second computing unit 24 that calculates a target throttle flow rate (target intake mass airflow), a third computing unit 26 that calculates a target throttle opening, and a fourth computing unit 28 that sets a virtual upstream intake air pressure. The operations of the ECU 20 as the first computing unit 22, second computing unit 24 and the third computing unit 26 are similar to the respective operations of the ECU 20 of the first embodiment. In the following, the operation of the ECU 20 as the fourth computing unit 28, which is a principal feature of the second embodiment, will be mainly explained.

Figure 7:
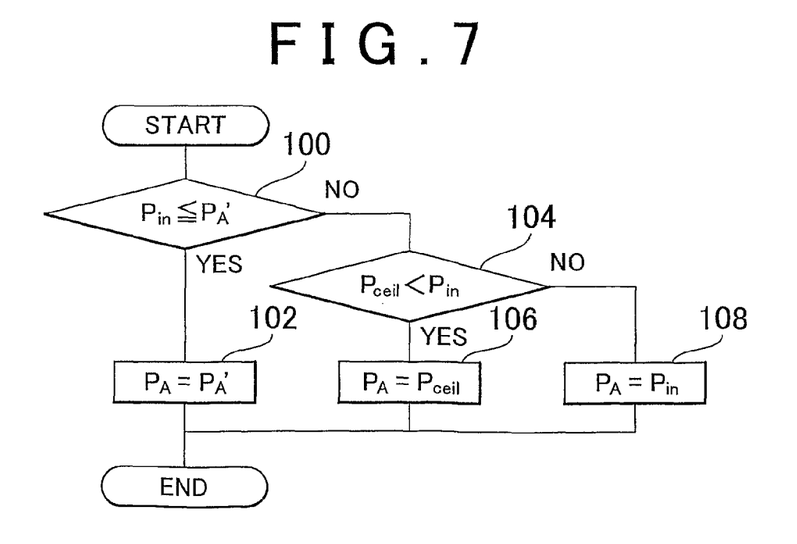
FIG. 7 is a flowchart illustrating a process of setting a virtual throttle upstream pressure in the second embodiment of the invention.

The flowchart of FIG. 7 illustrates a procedure according to which the fourth computing unit 28 sets the virtual upstream intake air pressure $P_A$. While the virtual upstream intake air pressure $P_A$ is set to a fixed or constant value in the first embodiment, the set value of the virtual upstream intake air pressure $P_A$ in the second embodiment is changed depending upon the level of the upstream intake air pressure $P_{IN}$ measured by the upstream intake air pressure sensor 32. The fourth computing unit 28 executes the routine shown in FIG. 7 each time the crankshaft reaches a predetermined crank angle.

In step 100 of the routine shown in FIG. 7, the upstream intake air pressure $P_{IN}$ is compared with a predetermined reference pressure $P_A'$. If the result of comparison indicates that the upstream intake air pressure $P_{IN}$ is equal to or lower than the reference pressure $P_A'$, the virtual upstream intake air pressure $P_A$ is set to the reference pressure $P_A'$ in step 102. The virtual upstream intake air pressure $P_A$ is kept at a constant pressure (i.e., reference pressure $P_A'$) until the upstream intake air pressure $P_{IN}$ exceeds the reference pressure $P_A'$.

If the result of comparison in step 100 indicates that the upstream intake air pressure $P_{IN}$ exceeds the reference pressure $P_A'$, the upstream intake air pressure $P_{IN}$ is then compared with a predetermined upper-limit pressure $P_{ceil}$ in step 104. The upper-limit pressure $P_{ceil}$ is the upper limit of the downstream intake air pressure, which limit is set for preventing breakage of the engine body 2. The above-indicated reference pressure $P_A'$ is set to a value that is higher than the atmospheric pressure but lower than the upper limit $P_{ceil}$ of the downstream intake air pressure.

If the result of comparison in step 104 indicates that the upstream intake air pressure $P_{IN}$ is equal to or lower than the upper-limit pressure $P_{ceil}$, the value of the upstream intake air pressure $P_{IN}$ measured by the upstream intake air pressure sensor 32 is set as the virtual upstream intake air pressure $P_A$ in step 108. Thus, the virtual upstream intake air pressure $P_A$ is set to be equal to the upstream intake air pressure $P_{IN}$, and is changed depending upon changes in the upstream intake air pressure $P_{IN}$, until the upstream intake air pressure $P_{IN}$ exceeds the upper-limit pressure $P_{ceil}$.

If the result of comparison in step 104 indicates that the upstream intake air pressure $P_{IN}$ exceeds the upper-limit pressure $P_{ceil}$, the virtual upstream intake air pressure $P_A$ is set to the upper-limit pressure $P_{ceil}$ in step 106. Thus, the virtual upstream intake air pressure $P_A$ is kept at a constant pressure (i.e., the upper-limit pressure $P_{ceil}$) while the upstream intake air pressure $P_{IN}$ is higher than the upper-limit pressure $P_{ceil}$.

Figure 8A:
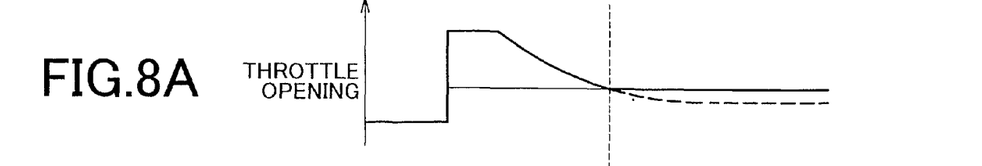
Figure 8B:
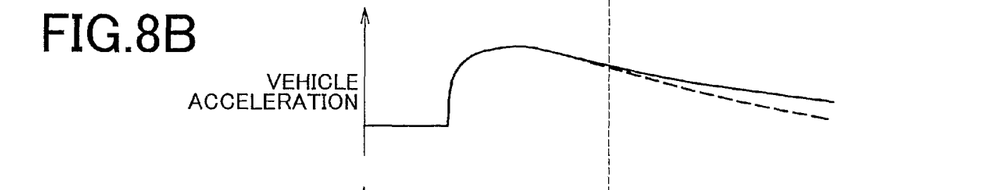
Figure 8C:
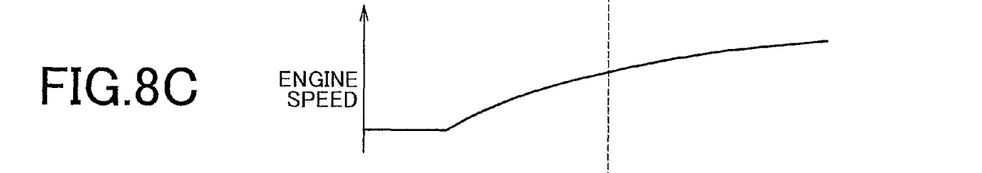
Figure 8D:
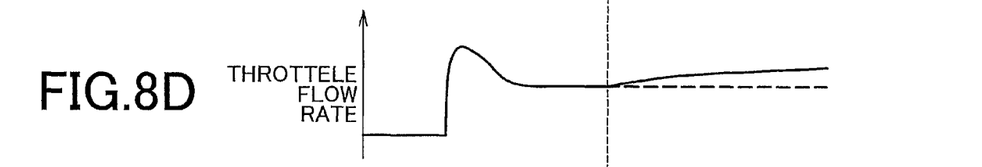
Figure 8E:
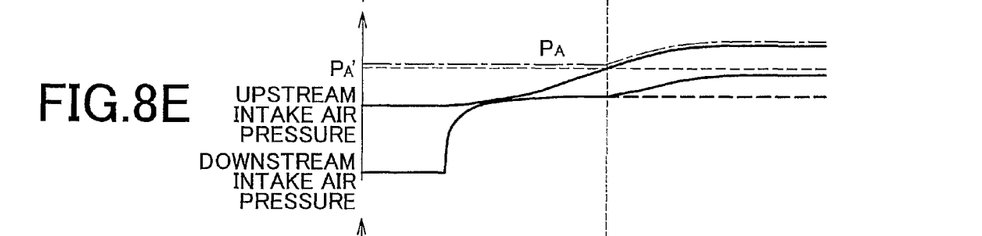
Figure 8F:
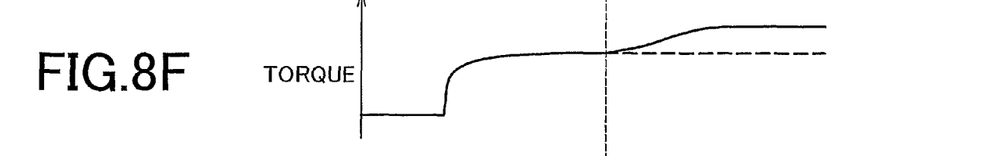
Figure 8G:
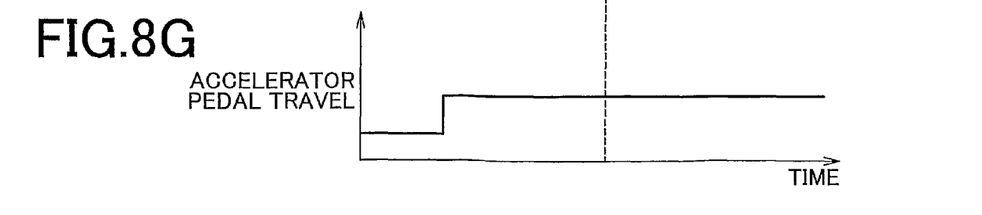

In the second embodiment, the ECU 20 controls the throttle valve 12 while changing the set value of the virtual upstream intake air pressure $P_A$ depending upon the level of the upstream intake air pressure $P_{IN}$ as described above. FIG. 8 shows the result of the throttle control performed by the ECU 20. In FIG. 8, changes in the throttle opening (A), vehicle acceleration (B), engine speed (C), throttle flow rate (D), upstream intake air pressure and downstream intake air pressure (E) and torque (F) are plotted against changes in the accelerator pedal travel (G) during acceleration of the vehicle, with respect to the turbo engine of this embodiment and the turbo engine of the first embodiment. In FIG. 8, thick solid lines indicate changes in the turbo engine of this embodiment, and thick broken lines indicate changes in the turbo engine of the first embodiment. In graph (E) of FIG. 8, the thin broken line indicates the reference pressure $P_A'$, and the thin dashed line indicates the set value of the virtual upstream intake air pressure $P_A$.

As shown in FIG. 8, the virtual upstream intake air pressure $P_A$ is kept at a constant level (=reference pressure $P_A'$) until the upstream intake air pressure $P_{IN}$ exceeds the reference pressure $P_A'$, so that substantially the same control result as that of the first embodiment is provided. Namely, the ECU 20 sets the throttle opening to a large degree immediately after the accelerator pedal is depressed, so as to make up for the low level of the upstream intake air pressure, thus assuring a throttle flow rate close to that of a naturally aspirated engine from the time immediately after start of acceleration. Then, the throttle opening is set to be smaller as the upstream intake air pressure $P_{IN}$ increases due to supercharging of the turbocharger 10, so that the throttle flow rate is kept being equivalent to that of the naturally aspirated engine even after the increase of the upstream intake air pressure $P_{IN}$. Thus, the turbo engine of this embodiment achieves step-free, smooth acceleration characteristics as provided by the naturally aspirated engine.

If the upstream intake air pressure $P_{IN}$ further increases due to supercharging of the turbocharger 10 and eventually exceeds the reference pressure $P_A{}'$, the virtual upstream intake air pressure $P_A$ is set to be equal to the upstream intake air pressure $P_{IN}$. With this setting, the target throttle opening $\theta$ calculated according to the above-indicated equation (5) is held at a constant value. As a result, the throttle flow rate increases as the upstream intake air pressure $P_{IN}$ increases, and the vehicle is accelerated at a rate corresponding to the increase of the upstream intake air pressure $P_{IN}$. Thus, the turbo engine of this embodiment achieves step-free, smooth acceleration characteristics similar to those of the naturally aspirated engine until the boost pressure of the turbo charger 10 rises to a sufficiently high level, and then provides excellent accelerating capability or performance peculiar to turbo engines after the boost pressure of the turbocharger 10 reaches a sufficiently high level.

Figure 9A:
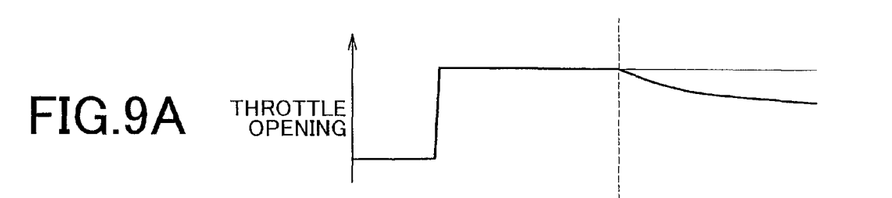
Figure 9B:
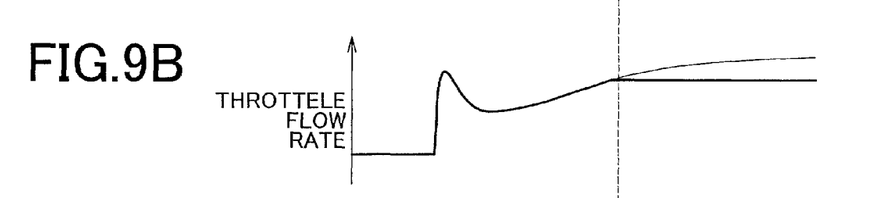
Figure 9C:
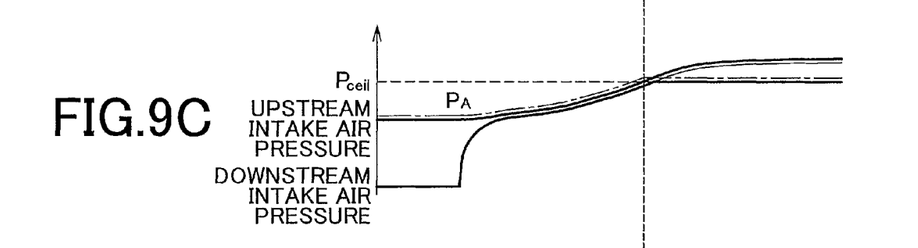
Figure 9D:
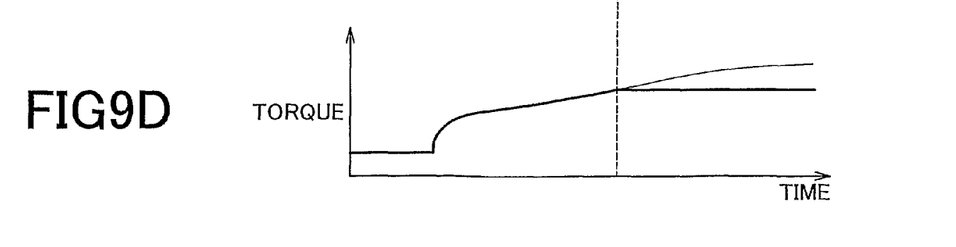

FIG. 8 shows changes in the respective operating conditions in a situation where the upstream intake air pressure $P_{IN}$ is equal to or lower than the upper-limit pressure $P_{ceil}$. FIG. 9 shows changes in the throttle opening (A), throttle flow rate (B), upstream intake air pressure and downstream intake air pressure (C) and torque (D), in a situation where the upstream intake air pressure $P_{IN}$ exceeds the upper-limit pressure $P_{ceil}$. In FIG. 9, thick solid lines indicate changes in the operating conditions of the turbo engine of this embodiment, and thin solid lines indicate changes in the operating conditions when the virtual upstream intake air pressure $P_A$ is not limited by the upper-limit pressure $P_{ceil}$. In graph (C) of FIG. 9, the thin broken line indicates the upper-limit pressure $P_{ceil}$, and the thin dashed line indicates the set value of the virtual upstream intake air pressure $P_A$. In FIG. 9, the upstream intake air pressure $P_{IN}$ is supposed to be higher than the reference pressure $P_A{}'$ from the beginning.

As shown in FIG. 9, until the upstream intake air pressure $P_{IN}$ exceeds the upper-limit pressure $P_{ceil}$, the virtual upstream intake air pressure $P_A$ is set to be equal to the upstream intake air pressure $P_{IN}$ so that the throttle opening is held at a constant value, and the throttle flow rate increases as the upstream intake air pressure $P_{IN}$ increases. If the upstream intake air pressure $P_{IN}$ further increases and eventually exceeds the upper-limit pressure $P_{ceil}$, the virtual upstream intake air pressure $P_A$ is set to be equal to the upper-limit value $P_{ceil}$. With this setting, the target throttle opening $\theta$ calculated according to the above-indicated equation (5) is reduced in accordance with the increase of the upstream intake air pressure $P_{IN}$, and the throttle flow rate is kept at the same value as that in the case where the upstream intake air pressure $P_{IN}$ is equal to the upper-limit pressure $P_{ceil}$ even after the upstream intake air pressure $P_{IN}$ becomes higher than the upper-limit pressure $P_{ceil}$. As a result, the downstream intake air pressure is prevented from being excessively high, namely, being higher than the upper-limit pressure $P_{ceil}$. Thus, the turbo engine of this embodiment is able to prevent the engine body 2 from being broken due to excessively high cylinder pressures, while assuring excellent accelerating capability.

Other Embodiments

While the invention has been described with reference to the illustrated embodiments, it is to be understood that the invention is not limited to the exemplary embodiments or constructions, but may be otherwise embodied with various changes, modifications or equivalent arrangements, without departing from the spirit and scope of the invention. For example, the illustrated embodiments may be modified, for example, in the manners as described below.

While the temperature $T_{IN}$ measured by the intake air temperature sensor 34 is used for calculation of the throttle flow rate $m_t{}'$ of the virtual engine model in the illustrated embodiments, it is to be noted that the temperature $T_{IN}$ varies depending upon weather conditions and supercharging conditions of the turbocharger 10. In order to accurately calculate the throttle flow rate $m_t{}'$ of the virtual engine model, it is desirable to perform the calculation using the intake air temperature $T_A$ that is actually assumed in the virtual engine model. In this case, the throttle flow rate $m_t{}'$ may be calculated according to the following equation (6).

$$m_t'(\theta') = \frac{P_A}{\sqrt{T_A}} B(\theta') \phi\left(\frac{P_{OUT}}{P_A}\right) \tag{6}$$

If the throttle flow rate $m_t{}'$ calculated according to the above equation (6) is regarded as the target throttle flow rate, the target throttle opening $\theta$ may be calculated according to equation (7) as indicated below. As will be understood from the equation (7), it is possible to correct the target throttle opening $\theta$ in accordance with the intake air temperature $T_{IN}$ by calculating the throttle flow rate $m_t{}'$ according to the above equation (6).

$$\theta = B^{-1}\left(\frac{P_A}{P_{IN}} \sqrt{\frac{T_{IN}}{T_A}} B(\theta')\Phi\left(\frac{P_{OUT}}{P_A}\right) \Big/ \Phi\left(\frac{P_{OUT}}{P_A}\right)\right) \tag{7}$$

In FIG. 10, changes in the throttle opening (A), vehicle acceleration (B), throttle flow rate (D) and the downstream intake air pressure (E) are plotted against changes in the intake air temperature (C) measured by the intake air temperature sensor 34, in the case where the target throttle opening $\theta$ is calculated according to the equation (7) and the case where the target throttle opening $\theta$ is calculated according to the above-indicated equation (5). In FIG. 10, thick solid lines indicate the changes in the operating conditions in the case where the target throttle opening $\theta$ is calculated according to the equation (7), and thin solid lines indicate the changes in the case where the target throttle opening $\theta$ is calculated according to the equation (5).

Figure 10A:
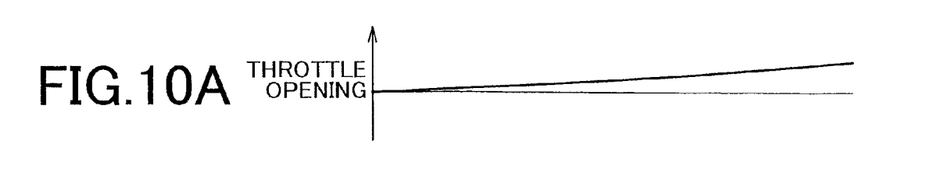
Figure 10B:
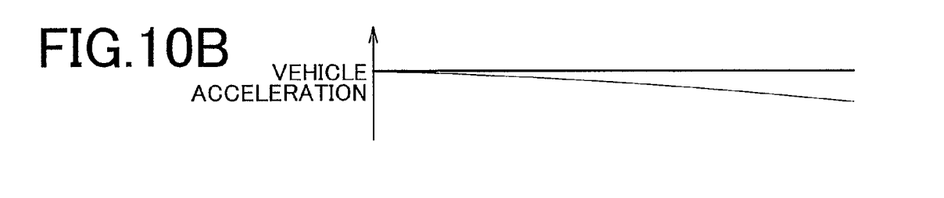
Figure 10C:
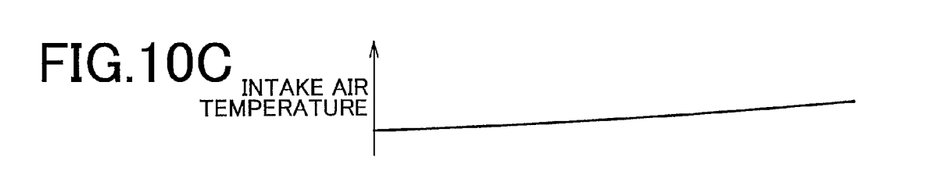
Figure 10D:
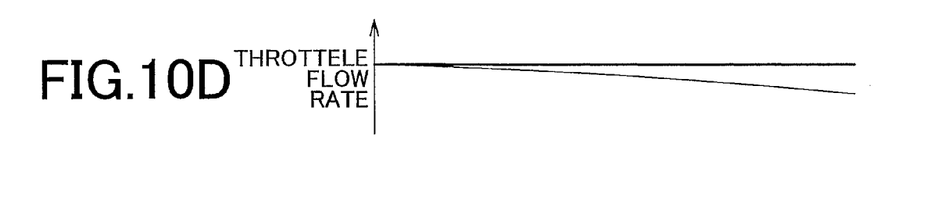
Figure 10E:
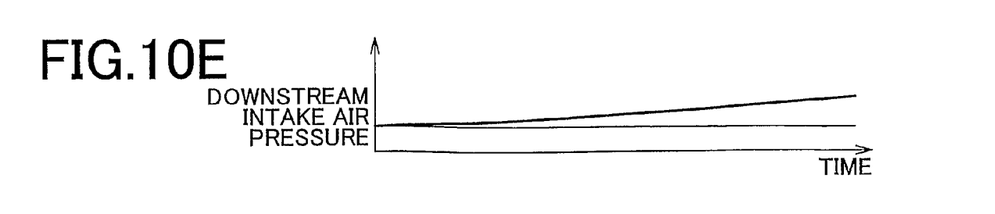
Figure 11A:
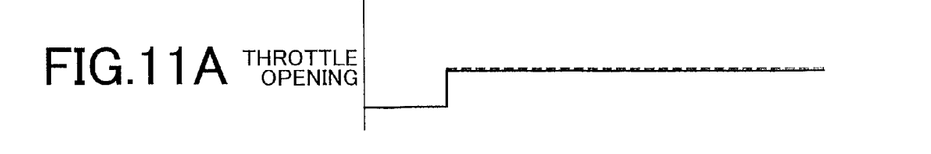
Figure 11B:
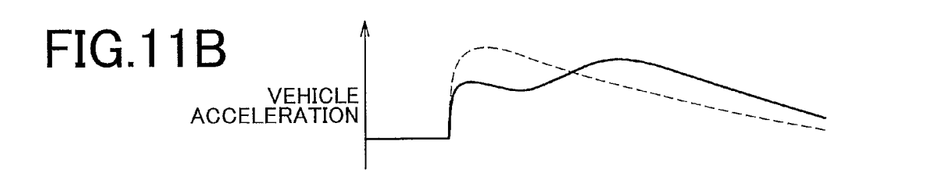
Figure 11C:
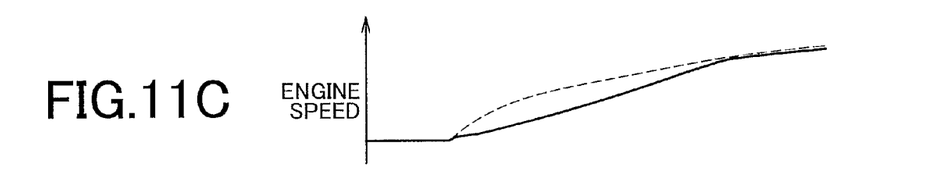
Figure 11D:
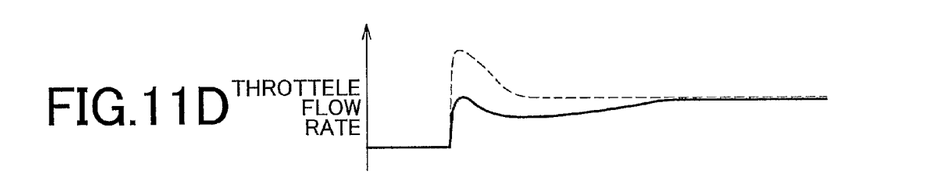
Figure 11E:
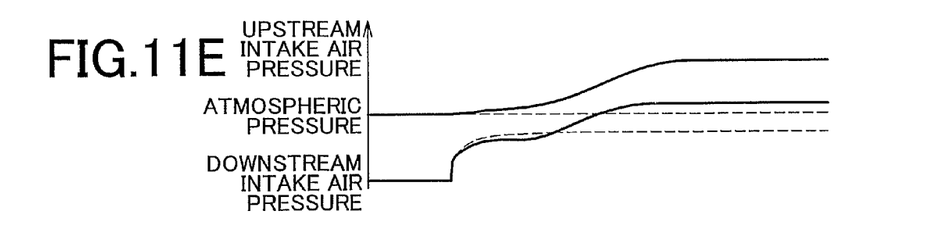
Figure 11F:
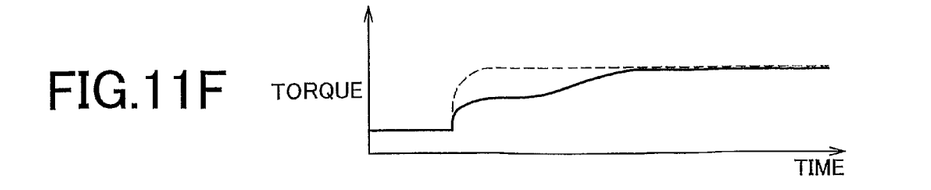

As the intake air temperature increases, the density of the intake air decreases, and, therefore, the throttle flow rate decreases if the throttle opening is constant, resulting in a reduction of the vehicle acceleration. According to the above-indicated equation (7), however, the target throttle opening $\theta$ is corrected in accordance with the intake air temperature, so that the throttle flow rate can be kept at a constant value irrespective of changes in the intake air temperature, and the vehicle acceleration can be held constant, as shown in FIG. 10.

While the turbocharger is used as a supercharger in the illustrated embodiments, the invention is not limitedly applied to engines equipped with turbochargers, but may be applied to engines equipped with other types of superchargers provided that the supercharger can increase the upstream intake air pressure. For example, the invention may be applied to an engine equipped with a mechanical supercharger.

It is also to be understood that the set value of the virtual upstream intake air pressure in the virtual engine model is not limited to that as explained above in the illustrated embodiments. Since the torque characteristics of the virtual engine model change depending upon the manner of setting the virtual upstream intake air pressure, the virtual upstream intake air pressure may be set in accordance with desired acceleration characteristics.

The invention claimed is:

1. A control system for an internal combustion engine equipped with a supercharger, comprising:
   (a) accelerator pedal travel measuring means for measuring a travel of an accelerator pedal,
   (b) intake air pressure measuring means for measuring a pressure of intake air at a location upstream of a throttle valve and downstream of the supercharger,
   (c) target intake mass airflow calculating means, including a virtual internal combustion engine model having a virtual upstream intake air pressure, for calculating a target intake mass airflow in accordance with the measured accelerator pedal travel, using a relationship between the accelerator pedal travel and the intake mass airflow in the virtual internal combustion engine model,
   (d) target throttle opening calculating means for calculating a target throttle opening in accordance with the measured upstream intake air pressure, so as to provide the calculated target intake mass airflow, and
   (e) throttle control means for controlling the throttle valve based on the target throttle opening,
   wherein the target throttle opening is controlled to open more when the accelerator pedal is first depressed until a quasi-equilibrium torque is achieved.

2. A control system as defined in claim 1, wherein the virtual upstream intake air pressure is set to a constant value in the virtual internal combustion engine model.

3. A control system as defined in claim 1, wherein the target intake mass airflow calculating means sets the virtual upstream intake air pressure in accordance with the measured upstream intake air pressure.

4. A control system as defined in claim 1, wherein the target intake mass airflow calculating means sets the virtual upstream intake air pressure of the virtual internal combustion engine model to a predetermined value when the measured upstream intake air pressure is equal to or lower than the predetermined value, and sets the virtual upstream intake air pressure to be equal to the measured upstream intake air pressure when the measured upstream intake air pressure exceeds the predetermined value.

5. A control system as defined in claim 4, wherein the predetermined value is lower than an upper-limit value of an intake air pressure at a location downstream of the throttle valve, and the target intake mass airflow calculating means sets the virtual upstream intake air pressure to the upper-limit value of the downstream intake air pressure when the measured upstream intake air pressure exceeds the upper-limit value of the downstream intake air pressure.

6. A control system as defined in claim 1, further comprising intake air temperature measuring means for measuring a temperature of intake air after supercharging by the supercharger, wherein the target throttle opening calculating means corrects the target throttle opening based on the intake air temperature measured by the intake air temperature measuring means.

7. A control method for an internal combustion engine equipped with a supercharger, comprising:
   measuring a travel of an accelerator pedal;
   measuring a pressure of intake air at a location upstream of a throttle valve and downstream of the supercharger;
   calculating a target intake mass airflow in accordance with the measured accelerator pedal travel, using a relationship between the accelerator pedal travel and the intake mass airflow in a virtual internal combustion engine model having a virtual upstream intake air pressure;
   calculating a target throttle opening in accordance with the measured upstream intake air pressure, so as to provide the target intake mass airflow; and
   controlling the throttle valve based on the target throttle opening,
   wherein the target throttle opening is controlled to open more when the accelerator pedal is first depressed until a quasi-equilibrium torque is achieved.

8. A control system for an internal combustion engine equipped with a supercharger, comprising:
   an accelerator pedal travel sensor that measures a travel of an accelerator pedal;
   an intake air pressure sensor that measures a pressure of intake air at a location upstream of a throttle valve and downstream of the supercharger;
   a target intake mass airflow calculator that includes a virtual internal combustion engine model having a virtual upstream intake air pressure, and calculates a target intake mass airflow in accordance with the measured accelerator pedal travel, using a relationship between the accelerator pedal travel and the intake mass airflow in the virtual internal combustion engine model;
   a target throttle opening calculator that calculates a target throttle opening in accordance with the measured upstream intake air pressure, so as to provide the calculated target intake mass airflow; and
   a throttle controller that controls a throttle valve based on the target throttle opening,
   wherein the target throttle opening is controlled to open more when the accelerator pedal is first depressed until a quasi-equilibrium torque is achieved.

9. A control system as defined in claim 8, wherein the virtual upstream intake air pressure is set to a constant value in the virtual internal combustion engine model.

10. A control system as defined in claim 8, wherein the target intake mass airflow calculator sets the virtual upstream intake air pressure in accordance with the measured upstream intake air pressure.

11. A control system as defined in claim 8, wherein the target intake mass airflow calculator sets the virtual upstream intake air pressure of the virtual internal combustion engine model to a predetermined value when the measured upstream intake air pressure is equal to or lower than the predetermined value, and sets the virtual upstream intake air pressure to be equal to the measured upstream intake air pressure when the measured upstream intake air pressure exceeds the predetermined value.

12. A control system as defined in claim 11, wherein the predetermined value is slower than an upper-limit value of an intake air pressure at a location downstream of the throttle valve, and the target intake mass airflow calculator sets the virtual upstream intake air pressure to the upper-limit valve of the downstream intake air pressure when the measured upstream intake air pressure exceeds the upper-limit value of the downstream intake air pressure.

13. A control system as defined in claim 8, further comprising an intake air temperature measuring device that measures a temperature of intake air after supercharging by the supercharger, wherein the target throttle opening calculator corrects the target throttle opening based on the intake air temperature measured by the intake air temperature measuring device.

* * * * *